US011310564B2

(12) United States Patent
Guajardo et al.

(10) Patent No.: US 11,310,564 B2
(45) Date of Patent: Apr. 19, 2022

(54) METHOD AND APPARATUS FOR ATSC TRANSMISSION STATION WITH SATELLITE FRONTHAUL

(71) Applicant: DISH Wireless L.L.C., Englewood, CO (US)

(72) Inventors: Marcel Guajardo, Englewood, CO (US); Jeffery Romaniuk, Castle Rock, CO (US)

(73) Assignee: DISH Wireless L.L.C, Englewood, CO (US)

( * ) Notice: Subject to any disclaimer, the term of this patent is extended or adjusted under 35 U.S.C. 154(b) by 0 days.

(21) Appl. No.: 16/874,210

(22) Filed: May 14, 2020

(65) Prior Publication Data

US 2021/0360328 A1    Nov. 18, 2021

(51) Int. Cl.
| | | |
|---|---|---|
| *H04N 21/61* | (2011.01) | |
| *H04N 21/236* | (2011.01) | |
| *H04N 21/2343* | (2011.01) | |
| *H04N 21/442* | (2011.01) | |
| *H04N 21/434* | (2011.01) | |
| *H04N 21/4402* | (2011.01) | |
| *H04N 21/239* | (2011.01) | |

(52) U.S. Cl.
CPC ....... *H04N 21/6143* (2013.01); *H04N 21/236* (2013.01); *H04N 21/2343* (2013.01); *H04N 21/2393* (2013.01); *H04N 21/434* (2013.01); *H04N 21/44209* (2013.01); *H04N 21/440218* (2013.01); *H04N 21/6193* (2013.01)

(58) Field of Classification Search
None
See application file for complete search history.

(56) References Cited

U.S. PATENT DOCUMENTS

| 5,875,396 | A | * | 2/1999 | Stockton | H04H 20/46 |
| | | | | | 455/562.1 |
| 10,805,688 | B1 | * | 10/2020 | Long | H04N 21/6131 |
| 2001/0053700 | A1 | * | 12/2001 | Sibley | H04N 21/4532 |
| | | | | | 455/517 |
| 2003/0058167 | A1 | * | 3/2003 | Rabinowitz | G01S 5/0081 |
| | | | | | 342/464 |
| 2008/0022324 | A1 | * | 1/2008 | Yang | H04N 21/4143 |
| | | | | | 725/81 |
| 2009/0284662 | A1 | * | 11/2009 | Ramaswamy | H04N 21/235 |
| | | | | | 348/724 |
| 2010/0175101 | A1 | * | 7/2010 | Devictor | H04N 21/236 |
| | | | | | 725/131 |
| 2011/0025561 | A1 | * | 2/2011 | Opshaug | G01S 19/46 |
| | | | | | 342/378 |
| 2012/0117584 | A1 | * | 5/2012 | Gordon | H04N 21/44213 |
| | | | | | 725/19 |

(Continued)

*Primary Examiner* — Alexander Q Huerta

(57) ABSTRACT

Systems and processes are provided for a micro ATSC transmitter including a satellite signal decoder configured to decode a satellite broadcast signal to generate a received audio video program, a data decoder configured to decoding a data signal from an ATSC broadcaster, a video processor configured to generate an altered audio video program in response to the received audio video program and the data signal, an ATSC encoder configured to encode the altered audio video program to generate an ATSC broadcast signal, and an ATSC transmitter configured to transmit the ATSC broadcast signal.

18 Claims, 5 Drawing Sheets

(56) References Cited

U.S. PATENT DOCUMENTS

| | | | |
|---|---|---|---|
| 2013/0332967 A1* | 12/2013 | Chang | H04N 21/4382 |
| | | | 725/68 |
| 2014/0152832 A1* | 6/2014 | Goldfeder | H04N 21/2365 |
| | | | 348/157 |
| 2014/0165110 A1* | 6/2014 | Sibley | H04N 21/812 |
| | | | 725/62 |
| 2014/0189765 A1* | 7/2014 | Green | H04N 21/23805 |
| | | | 725/110 |
| 2014/0317274 A1* | 10/2014 | Parker | H04H 60/32 |
| | | | 709/224 |
| 2015/0043491 A1* | 2/2015 | Eng | H04W 16/14 |
| | | | 370/329 |
| 2018/0227635 A1* | 8/2018 | Crowe | H04N 21/233 |
| 2019/0199460 A1* | 6/2019 | Simon | H04H 20/67 |
| 2019/0222375 A1* | 7/2019 | Wu | H04L 1/007 |
| 2021/0099749 A1* | 4/2021 | Bogatin | H04N 21/432 |

* cited by examiner

METHOD AND APPARATUS FOR ATSC TRANSMISSION STATION WITH SATELLITE FRONTHAUL

TECHNICAL FIELD

The following discussion generally relates to transmission and reception of data and audio video programming on an electronic apparatus. More particularly, the following discussion relates reception of an audio video signal via a first broadcast medium, alteration of the audio video signal and retransmission of the altered audio video signal via a second broadcast medium.

BACKGROUND

The real-time presentation of audio video programs, such as via broadcast television, has been an entertainment staple for the better part of a century. Early television broadcast stations in the United States transmitted black and white television programming using the National Television System Committee (NTSC) standard. In 1954 the NTSC introduced a color broadcast format wherein a color information subcarrier was added to the black and white luminance signal. In 2015, NTSC broadcasts were replaced with Advanced Television System Committee (ATSC) digital television broadcasts. Today, audio video programming may be received via over the air broadcast, cable networks, satellite transmission, streaming via the internet or other network connection in many different resolutions and formats.

ATSC 1.0 is the current over the air (OTA) digital television broadcast standard in the United States. ATSC 1.0 was launched in the United States in 2009 and covers the 54 to 598 MHz frequency range for TV broadcasters who use ATSC 1.0 to broadcast free OTA television programming in every designated market area (DMA). The next generation TV broadcast standard is ATSC 3.0 launching in 2020 using OFDM modulation and Internet Protocol to enhance the efficiency of the broadcast signal to deliver more services to customers than just HD 720P video to a fixed television receiver. Additional services may include 4K HDR video and datacasting services using the same 6-8 MHz channel bandwidth traditionally used for television broadcasting. For transmitting ATSC 1.0, broadcasters typically rely on a single macro broadcast tower to cover an entire city or town. ATSC 3.0 may require broadcasters to install additional micro towers to provide adequate coverage for a broadcast region. A challenge of micro broadcast tower installations is a need for fiber infrastructure to be in the ground which is quite often not conveniently located to support the optimal placement of the tower. To overcome these problems, it would be desirable to facilitate a method and apparatus for providing micro broadcast towers at optimal locations within a broadcast region without having to provide wired or optical communications to each of the micro towers. Other desirable features and characteristics will become apparent from the subsequent detailed description and the appended claims, taken in conjunction with the accompanying drawings and this background section.

BRIEF SUMMARY

Disclosed herein are human machine interface methods and systems and related circuitry for provisioning computational systems, methods for making and methods for operating such systems, and system equipped with electronic data reception systems. By way of example, and not limitation, presented are various embodiments of reception and retransmission of an audio video program and other data to provide an ATSC 3.0 transmission station with satellite fronthaul are disclosed herein.

In accordance with an aspect of the disclosure, a method including receiving a request for to transcode an audio video program, decoding a satellite broadcast signal to generate an audio video program signal in response to the request, encoding the audio video program signal to generate an ATSC broadcast signal, transmitting the ATSC broadcast signal via an ATSC transmission tower.

In accordance with another aspect of the disclosure wherein the satellite broadcast signal is transmitted by a satellite television broadcaster.

In accordance with another aspect of the disclosure further including substituting a portion of the audio video program with an alternate audio video program portion to generate an altered audio video program and wherein the audio video program is encoded to generate the ATSC broadcast signal.

In accordance with another aspect of the disclosure wherein the method is performed by a micro ATSC transmitter.

In accordance with another aspect of the disclosure wherein the request is generated in response to a loss of reception of a primary ATSC broadcast signal at an ATSC receiver.

In accordance with another aspect of the disclosure wherein the request is generated by an ATSC broadcaster.

In accordance with another aspect of the disclosure wherein the request is received via a cellular wireless network.

In accordance with another aspect of the disclosure wherein the satellite broadcast signal is transmitted by a satellite television broadcaster and the audio video program is provided to the satellite television broadcaster by an ATSC broadcaster.

In accordance with another aspect of the disclosure an apparatus including a satellite signal decoder configured to decode a satellite broadcast signal to generate a received audio video program, a data decoder configured to decoding a data signal from an ATSC broadcaster, a video processor configured to generate an altered audio video program in response to the received audio video program and the data signal, an ATSC encoder configured to encode the altered audio video program to generate an ATSC broadcast signal, and an ATSC transmitter configured to transmit the ATSC broadcast signal.

In accordance with another aspect of the disclosure wherein the data signal includes a substitute audio video program and wherein a portion of the received audio video program is replaced by the substitute audio video program to generate the altered audio video program.

In accordance with another aspect of the disclosure wherein the data decoder is configured to receive the data signal from a cellular network receiver.

In accordance with another aspect of the disclosure wherein the data signal is generated by an ATSC broadcaster.

In accordance with another aspect of the disclosure wherein the data signal includes auxiliary ATSC data including at least one of a transmitter identification, a guide information, and a subchannel program.

In accordance with another aspect of the disclosure wherein the satellite broadcast signal is transmitted by a satellite television broadcaster in response to an ATSC broadcast audio video program generated by an ATSC broadcaster.

In accordance with another aspect of the disclosure including an ATSC receiver configured to detect a signal level of a primary ATSC broadcast signal and wherein the data signal is generated in response to the signal level being below a threshold signal level.

In accordance with another aspect of the disclosure wherein the data signal is generated in response to a loss of signal notification generated by an ATSC receiver proximate to the apparatus.

In accordance with another aspect of the disclosure wherein the apparatus is a micro ATSC transmitter.

In accordance with another aspect of the disclosure including an ATSC receiver configured to receive a primary ATSC broadcast signal and wherein the data signal is generated in response to the primary ATSC broadcast signa.

In accordance with another aspect of the disclosure, a micro ATSC transmitter including a cellular transceiver configured receive a request to transmit an ATSC broadcast signal wherein the requests includes a satellite signal identifier and an ATSC auxiliary data, a satellite receiver configured to receive a satellite broadcast signal and to decode the satellite broadcast signal to generate a received audio video program, a video processor configured to generate an altered audio video program in response to the request and the received audio video program, and an ATSC transmitter for encoding the altered audio video program to generate an ATSC broadcast signal and to transmit the ATSC broadcast signal to an ATSC receiver.

In accordance with another aspect of the disclosure wherein the request is generated in response to a signal level of a primary ATSC broadcast signal detected by the ATSC receiver.

The above advantage and other advantages and features of the present disclosure will be apparent from the following detailed description of the preferred embodiments when taken in connection with the accompanying drawings.

BRIEF DESCRIPTION OF THE DRAWING FIGURES

The exemplary embodiments will hereinafter be described in conjunction with the following drawing figures, wherein like numerals denote like elements, and wherein.

The exemplifications set out herein illustrate preferred embodiments of the disclosure, and such exemplifications are not to be construed as limiting the scope of the disclosure in any manner.

DETAILED DESCRIPTION

The following detailed description is intended to provide various examples, but it is not intended to limit the disclosure or the application and uses of the disclosure. Furthermore, there is no intention to be bound by any theory presented in the preceding background or the following detailed description.

The general concepts described herein may be implemented in any audio video broadcast device or connected device that may be used for audio video broadcasting, streaming or presentation to an audio video display device the like. For convenience of illustration, the following discussion often refers to a video signal processing device, such as a wireless transceiver, operative to receive audio video content encoded in a first format such as a satellite broadcast format, to decode the video content, encode the audio video content in a second format, such as ATSC 3.0 and then transmit the audio video content encoded in the second format. The actions taken in response to the transmission, presentation and alteration of audio video content for display to a viewer may also be associated with the functionality of the mobile phones, portable electronic entertainment devices, and any other electronic media device capable of image or video display and/or playback. Additional details and examples are provided in the following description.

Figure 1:
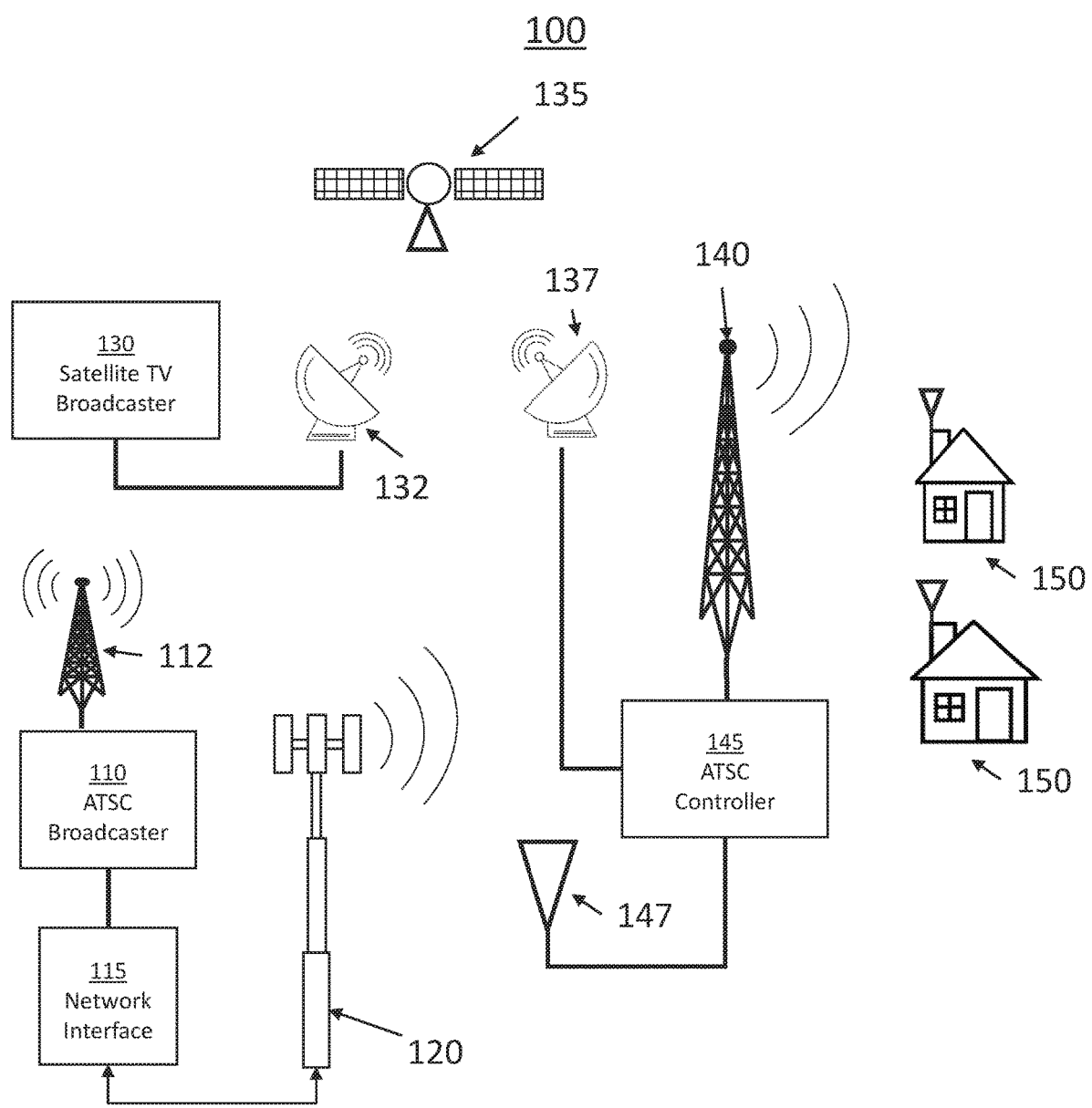
FIG. 1 shows an environment for television broadcast fronthaul according to an exemplary embodiment of the present disclosure.

Turning now to FIG. 1, an environment 100 for television broadcast fronthaul according to an exemplary embodiment of the present disclosure is shown. The exemplary system may include an ATSC broadcaster 110, an ATSC macro television transmitter 112, a network interface 115, a cellular transmitter 120, a satellite television broadcaster 130, a satellite transmit antenna 132, a satellite 135, a satellite receive antenna 127, a micro ATSC transmitter 140, an ATSC controller 145, a ATSC controller antenna 147, and ATSC television signal receivers 150.

In this exemplary embodiment, the exemplary ATSC broadcaster 110 is operative to transmit an ATSC television and/or data signal to television receivers within a broadcast area using an ATSC macro broadcast transmitter 112. However, a problem arises in that all areas within a broadcast area may not receive a sufficiently strong ATSC signal from the macro broadcast transmitter 112 to satisfactorily receive and decode the broadcast channel. For example, in broadcast areas including mountain ranges, receivers in valleys within the mountain ranges may not receive a signal with satisfactory signal strength. Likewise, in dense urban environments, multipath resulting from signal reflections from buildings may introduce interference rendering the signal undecodable. In order to address these problems, a micro ATSC transmitter 140 may be installed in order to broadcast an ATSC signal in an area with problematic reception.

Usually, the employment of a micro ATSC transmitter 140 requires connecting the ATSC broadcaster 110 to the micro ATSC transmitter 140 via a wired network connection, such as a fiber optic link, or via a line of site wireless transmission. These data connections may also be problematic as providing a wired network link in a remote region or dense urban environment may be cost probative. Further, line of site wireless transmission may also not be possible in areas where television broadcast is not possible for many of the same reasons, such as obstructive terrain and/or man-made obstructions such as buildings. To address these problems, it is desirable to reduce the amount of data that must be transmitted from the ATSC broadcaster 110 to the micro ATSC transmitter 140 while still enabling broadcast of the ATSC broadcaster's television programming According to an exemplary embodiment of the exemplary system, much of the content to be transmitted by the ATSC broadcaster 110 may be available from other broadcasters. For example, a national satellite tv broadcaster 130 may be transmitting national and local channel content to regions including the ATSC broadcaster's broadcast area. If the content is available at the micro ATSC transmitter 140, the broadcaster may be able to configure a system to capture the content in the received format, such as DVB-S format for satellite broadcast transmission, to alter the content as required, such as replacing portions of the content, like commercials or broadcaster identification, with other content, and reencoding the altered content into a format suitable for ATSC transmission by the micro ATSC transmitter 140.

In the exemplary embodiment, the satellite TV broadcaster 130 is operative to encode an audio video program into a format suitable for satellite transmission, such as DVB-S, and to transmit the encoded audio video program via a satellite transmit antenna 132. The encoded audio video program is received by a satellite 135 and retransmitted to a satellite receive antenna 137. The encoded audio video program is then coupled to the ATSC controller 145 where it is decoded to extract the audio video program. In one exemplary embodiment, the encoded audio video program is a continuous broadcast television stream.

The ATSC broadcaster 110 is configured to transmit an ATSC audio video program via a macro ATSC macro broadcast transmitter 112 to ATSC television receivers within a broadcast area. The ATSC 110 is further operative to transmit a data file associated with the audio video program. That data file may include a start and stop time associated with the audio video program, a channel for the audio video program, additional audio video program segments associated with the audio video program, etc. In one exemplary embodiment, the additional audio video program segments may include a television commercial, a station identifier, a title sequence, or the like. The ATSC broadcaster 110 may then couple the data file to a cellular transmitter 120 via a network interface 115. In one embodiment, the cellular transmitter 120 is located proximate to the ATSC broadcaster 110. Alternatively, the cellular transmitter 120 may not be located proximate to the ATSC broadcaster 110 and the data file may be coupled to the cellular transmitter 120 via the network interface 115 and a wired network, such as the internet.

The cellular transmitter 120 is configured to encode and transmit the data file associated with the audio video program to an ATSC controller antenna 147 via a wireless cellular transmission network. The ATSC controller 145 may then receive and decode the data file from the ATSC controller antenna 147. The ATSC controller may then alter the audio video program received via the satellite TV broadcaster 130 according to the data file to generate an altered audio video program. In one exemplary embodiment, the altered audio video program is the same as the ATSC audio video program transmitted via the macro ATSC broadcast transmitter 112. The altered audio video program is then coupled to the micro ATSC transmitter for transmission to a plurality of ATSC television signal receivers 150. According to the exemplary embodiment, this plurality of ATSC television signal receivers 150 are not able to receive the ATSC audio video program transmitted via the macro ATSC macro broadcast transmitter 112 due to low signal strength, multipath, interference, or the like.

Figure 2:
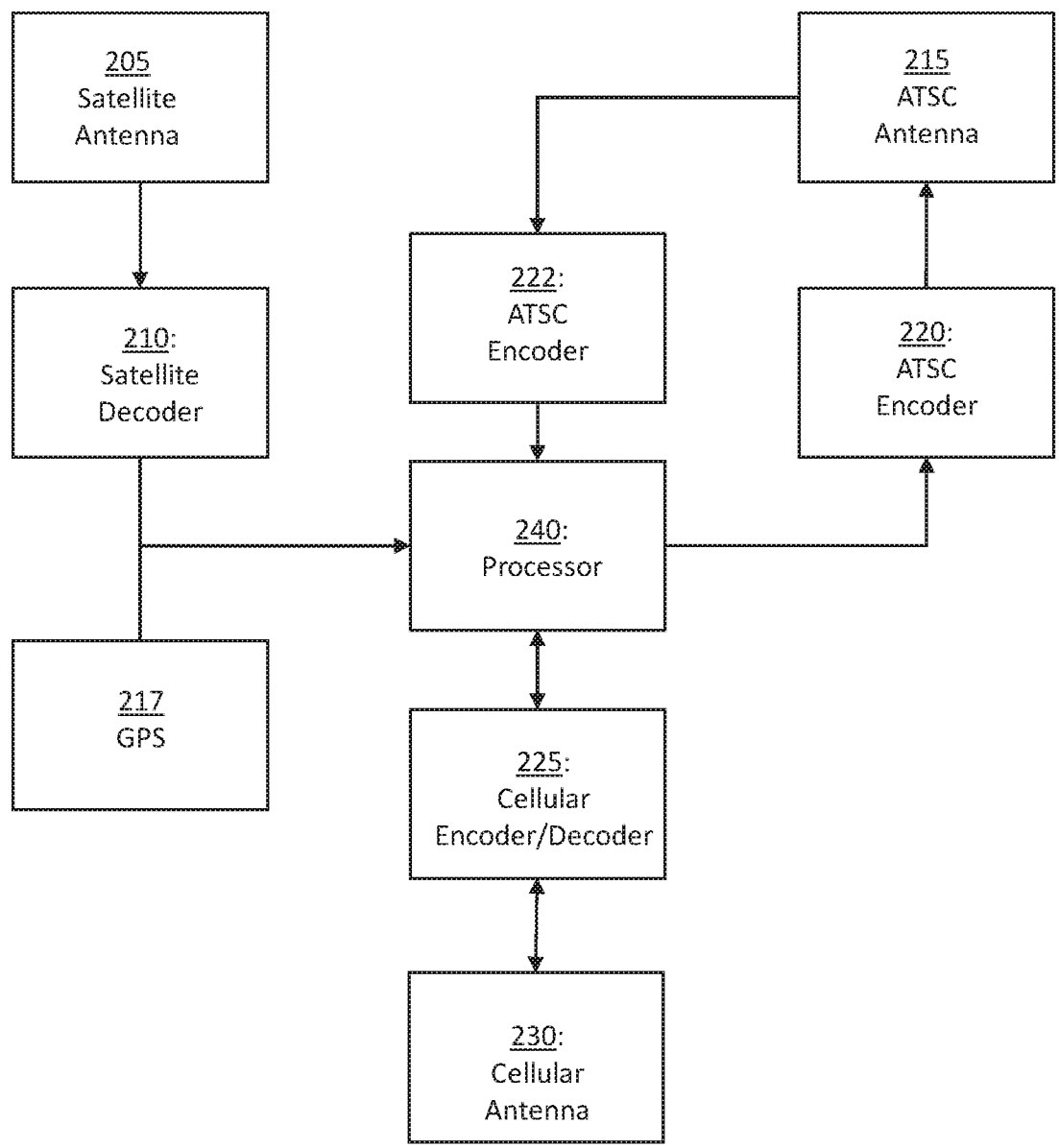
FIG. 2 shows a block diagram illustrating an exemplary ATSC micro transmitter for reception and retransmission of an audio video program and other data according to an exemplary embodiment of the present disclosure.

Turning now to FIG. 2, an exemplary ATSC micro transmitter 200 for reception and retransmission of an audio video program and other data according to an exemplary embodiment of the present disclosure is shown. The exemplary ATSC micro transmitter 200 includes a satellite antenna 205, a satellite decoder 210, an ATSC antenna 215, global positioning system (GPS) 217, an ATSC encoder 220, a cellular antenna 230, a cellular encoder/decoder 225 and a processor 240.

In this exemplary embodiment, the satellite antenna 205 is configured to receive a satellite broadcast signal transmitted via a satellite broadcaster, such as DISH® network. The satellite broadcast signal may include a number of encoded audio video programs modulated according to a DVB-S standard or the like. For example, the satellite antenna 205 may include a low noise block for receiving, amplifying and down converting a frequency bandwidth having a plurality of encoded audio video programs modulated at frequencies within the frequency bandwidth. The satellite antenna 205 may receive, amplify and downconvert the plurality of encoded video programs and couple the plurality of encoded video program to the satellite decoder 210.

The satellite decoder 210 is configured to receive an encoded audio video program from the satellite antenna 205 and to generate a baseband audio video program in response to the encoded audio video program. For example, the satellite decoder 210 may receive a plurality of encoded video programs from the satellite antenna, may select and decode one of the plurality of encoded video programs to generate the baseband audio video program. In one exemplary embodiment, the desired audio video program may be selected in response to a data file from an ATSC broadcaster which may be indicative of at least one of a desired audio video program, frequency, start and stop times, encryption information and the like.

The cellular antenna 230 may transmit and receive data via a wireless cellular network. In one exemplary embodiment, the data may be generated by an ATSC broadcaster, coupled to a network interface for transmission to a cellular transmission tower. The data may be then transmitted via a cellular transmission signal by the cellular transmit tower to the cellular antenna 230. The cellular antenna 230 may be operative to amplify and/or filter the cellular transmission signal and couple the cellular transmission signal to the cellular encoder/decoder. The cellular antenna 230 may further be operative to transmit a cellular data signal from the cellular encoder/decoder 225 via the cellular network. In an exemplary embodiment, the cellular data signal may be indicative of reception and encoding information from the processor 240 related to the desired audio video program.

The cellular encoder/decoder 225 is operative to receive a cellular transmission signal from the cellular antenna 230 and to decode the cellular transmission signal to extract a data file. In one exemplary embodiment, the data file may be indicative of a satellite transmission signal, an audio video program and or ATSC transmission data. The cellular encoder/decoder 225 is further configured for encoding data from the processor 240 into a format suitable for transmission via the wireless cellular network. This encoded data may be coupled to the cellular antenna 230 for transmission to an ATSC broadcaster wherein the encoded data is indicative of a signal reception status of the satellite decoder 210 and/or a signal transmission status of an ATSC encoder 220.

The ATSC encoder 220 is operative to receive an audio video program or audio video stream from the processor 240 for encoding into an ATSC format, such as ATSC 3.0, and coupling to an ATSC antenna 215 for transmission to ATSC receivers within a broadcast area. In an exemplary embodiment, the ATSC encoder is operative to receive an audio video program generated by the processor 240 in response to an audio video program decoded by the satellite decoder 210 and altered with data, such as short audio video program segments, decoded by the cellular encoder/decoder 225.

In this exemplary embodiment the ATSC antenna 215 is operative to transmit one or more audio video programming broadcasts and data from the ATSC encoder 220. An ATSC audio video program coupled from the ATSC encoder 220 may be encoded in an ATSC 1.0 or ATSC 3.0 format. The ATSC antenna 205 maybe further be operative to upconvert the ATSC audio video program to a frequency suitable for wireless broadcast transmission. In addition, the ATSC antenna 205 may be directional in order to increase a transmit power in a first direction while reducing a transmit power in a second direction in order to transmit the ATSC signal with a sufficient power to reach a certain geographical location unable to receive an ATSC broadcast from a macro ATSC transmitter. In addition, an ATSC directional antenna may be useful in reducing multipath and/or ghosting for an ATSC signal.

The processor 240 is operative to receive an audio video program from the satellite decoder 210 and to couple an altered audio video program to the ATSC encoder 220. In one exemplary embodiment, the audio video program received from the satellite decoder 210 is a continuous stream of audio video data generated by a network television broadcaster. The audio video data may include a transmitter identification related to a satellite transmission channel or a satellite broadcaster. The processor 240 is then operative to replace the transmitter identification with an alternate transmitter identification corresponding to an ATSC transmission channel or an ATSC broadcaster to generate an altered audio video data. The alternate transmission identification may be received from the cellular encoder/decoder 225. The altered audio video data is then coupled to the ATSC encoder 220 for ATSC encoding and broadcast transmission via the ATSC antenna. In one exemplary embodiment, the processor 240 may be further coupled to a GPS 217 wherein the GPS 217 is operative to receive GPS satellite signals and estimate a location in response to the GPS satellite signals. The GPS 217 may then provide the estimated location to the processor 240 to allow for geographic validation of the exemplary micro transmitter 200.

In one exemplary embodiment, the ATSC antenna 215, or a collocated antenna, is configured to receive an ATSC broadcast signal from a macro ATSC broadcaster. The ATSC decoder 222 is configured to decode the ATSC broadcast signal and to couple the decoded ATSC broadcast signal to the processor 240. At least one of the ATSC antenna 215, the ATSC decoder 222 and the processor 240 are configured to determine at least one of a signal quality of the decoded ATSC broadcast signal, a signal quality of the encoded ATSC broadcast signal, a signal strength of the ATSC broadcast signal to evaluate a current signal quality of the ATSC broadcast signal. If the current signal quality is below a threshold level, indicating that receivers within the ATSC micro transmitter 200 broadcast area may not receive the ATSC broadcast signal from the macro transmitter, the processor 240 may be operative to generate a notification signal indicative of the low signal quality and couple this notification signal to the cellular encoder/decoder 225 for transmission to the ATSC broadcaster. In response, the ATSC broadcaster may activate the micro transmitter 200 for rebroadcast of the audio video programming.

Figure 3:
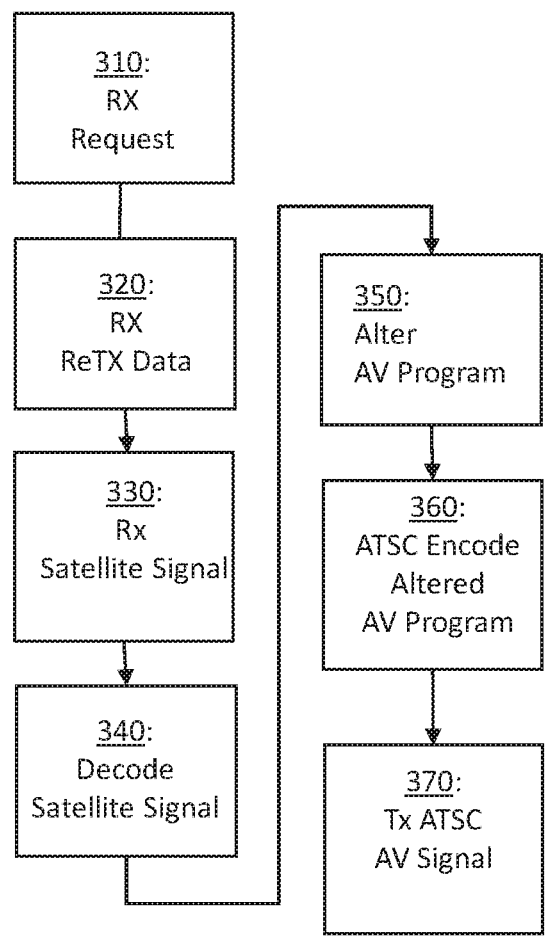
FIG. 3 shows a flowchart illustrating a method for reception, alteration and retransmission of an audio video program and other data according to an exemplary embodiment of the present disclosure.

Turning now to FIG. 3, a method 300 for reception, alteration and retransmission of an audio video program and other data according to an exemplary embodiment of the present disclosure is shown. The method is first operative to receive 310 a request to retransmit an audio video program. The request may be indicative of a source of the audio video program, such as a satellite transmission channel, frequency, transponder or the like. In one exemplary embodiment, the request may be generated by an ATSC broadcaster and may be indicative of a satellite transmission channel carrying a retransmission of the ATSC broadcaster's audio video broadcast. The request may be indicative of a start time and a stop time for the rebroadcast. In addition, the request may be generated in response to an inadequate signal level from a macro ATSC transmitter in a location proximate to a micro ATSC transmitter. For example, in a valley within a mountainous region, the broadcaster may monitor signal strength or signal quality of a main ATSC television broadcast within the valley from a macro ATSC transmitter outside of the valley. If the signal strength or quality drops below a threshold value where reliable signal reception is unlikely, the ATSC broadcaster may request that a micro ATSC transmitter within the valley receive a satellite transmission of the broadcasters audio video program, decode the satellite signal, encode the audio video program in an ATSC format and retransmit the audio video program within the valley.

The method then receives 320 retransmission data from the ATSC broadcaster via a data network, such as the internet, low frequency or low speed data transmission, wireless cellular network, line of sight wireless transmission. Alternatively, the method may receive data via a data channel within the ATSC broadcast. In this example, while the ATSC broadcast signal may not have a sufficient signal quality or power for suitable ATSC audio video program transmission, the ATSC broadcast signal may be suitable for conveying retransmission data to micro ATSC transmitters at a lower bitrate or with increased error correction data. In one exemplary embodiment, the retransmission data may be received at a time prior to the audio video program and may be stored in memory for use at a later time during retransmission of the audio video program.

The exemplary method next receives 330 the satellite signal as indicated by the request and/or the retransmission data. The method may tune to the appropriate satellite frequency, receive, amplify, and filter the satellite signal. The method then decodes 330 the filtered satellite signal to generate an audio video program. The audio video program may be a continuous streaming video. The audio video program may be a baseband audio video program or may be decoded to a format suitable for encoding by an ATSC encoder.

The method is then configured to alter 350 the audio video program received via the satellite signal in response to instructions received from the retransmission data. The alterations may include substitutions of portions of the audio video program such as station identifiers, commercials, location specific programing or the like. An altered audio video program is generated in response to the alteration of the audio video program. In an alternate exemplary embodiment, the audio video program content may not be altered and the audio video program content may be rebroadcast as received with only auxiliary ATSC data such as guide information, channel identifiers, program information and the like being added to the audio video program. The altered audio video program is then encoded 360 according to an ATSC standard, such as ATSC 3.0 to generate an ATSC transmission signal. The ATSC transmission signal is then transmitted 370 to a plurality of ATSC receivers via an ATSC antenna coupled to a micro ATSC transmitter.

Figure 4:
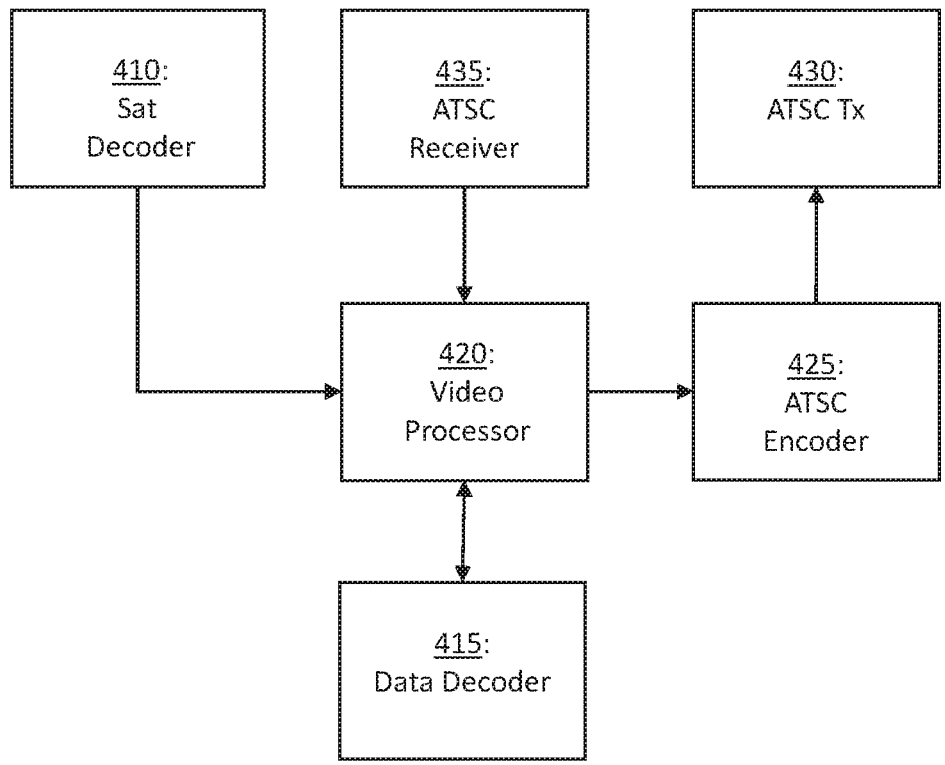
FIG. 4 shows a block diagram illustrating a system for reception, alteration and retransmission of an audio video program and other data according to another exemplary embodiment of the present disclosure.

Turning now to FIG. 4, a system 400 for reception, alteration and retransmission of an audio video program and other data according to an exemplary embodiment of the present disclosure is shown. The exemplary system 400 may be a micro ATSC transmitter including a satellite signal decoder 410, a data decoder 415, a video processor 420, an ATSC encoder 425, an ATSC transmitter 430, and an ATSC receiver 435.

In this exemplary embodiment, the satellite signal decoder 410 is configured to receive a satellite broadcast signal and to decode the satellite broadcast signal to generate a received audio video program. The satellite broadcast signal may be transmitted by a satellite television broadcaster in response to an ATSC broadcast audio video program generated by an ATSC broadcaster. For example, in addition to broadcasting the ATSC broadcast audio video signal, the ATSC broadcaster may supply the ATSC broadcast audio video signal to a satellite television broadcaster for delivery to satellite television broadcast subscribers.

The data decoder 415 may be configured for decoding a data signal from an ATSC broadcaster where the data signal is generated by an ATSC broadcaster. The data decoder 415 may be operative to receive the data signal from a cellular network receiver. The data signal may include auxiliary ATSC data including at least one of a transmitter identification, a guide information, and a subchannel program. In addition, the data signal may include a substitute audio video program, such as a title sequence, station identification, local programming such as a weather report, or commercials. In one exemplary embodiment, the data signal is generated in response to a loss of signal notification generated by an ATSC viewer device proximate to the apparatus. For example, the ATSC viewer device may be a device at a viewer's home. In the event of a signal loss, the ATSC viewer device may generate a loss of signal notification and transmit the notification to the ATSC broadcaster via a network connection, back channel, or wireless network connection.

The exemplary system 400 may further include a video processor 420 configured to generate an altered audio video program in response to the received audio video program and the data signal. For example, a portion of the received audio video program may be replaced by the substitute audio video program to generate the altered audio video program.

The exemplary system 400 may include an ATSC encoder 425 configured to encode the altered audio video program to generate an ATSC broadcast signal and an ATSC transmitter 430 configured to transmit the ATSC broadcast signal. In addition, the system 400 may include an ATSC receiver 435 configured to receive a primary ATSC broadcast signal. In this example, the data signal may be generated in response to the primary ATSC broadcast signal. In addition, the ATSC receiver 435 may be configured to detect a signal level of a primary ATSC broadcast signal and wherein the data signal is generated in response to the signal level being below a threshold signal level.

In another exemplary embodiment, the system 400 is a micro ATSC transmitter wherein the data decoder 415 is a cellular transceiver configured receive a request to transmit an ATSC broadcast signal. In one exemplary embodiment, the request may include a satellite signal identifier and an ATSC auxiliary data. The micro ATSC transmitter may further include a satellite receiver including a satellite signal decoder 410 and a satellite antenna configured to receive a satellite broadcast signal and to decode the satellite broadcast signal to generate a received audio video program. The exemplary system 400 further includes a video processor 420 configured to generate an altered audio video program in response to the request and the received audio video program. An ATSC transmitter 430 is configured for encoding the altered audio video program to generate an ATSC broadcast signal and to transmit the ATSC broadcast signal to an ATSC receiver. In one exemplary embodiment, the request may be generated in response to a signal level of a primary ATSC broadcast signal detected by the ATSC receiver.

Figure 5:
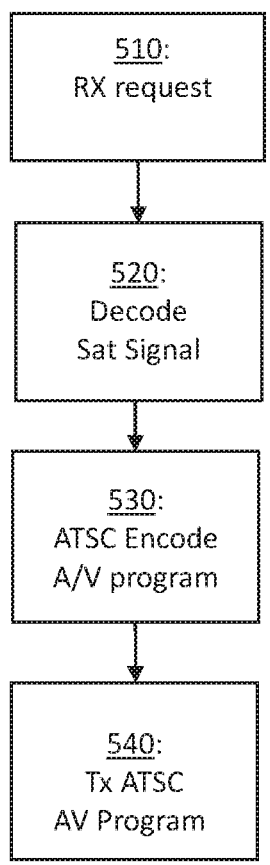
FIG. 5 shows a flowchart illustrating a method for reception, alteration and retransmission of an audio video program and other data according to another exemplary embodiment of the present disclosure.

Turning now to FIG. 5, a method 500 for reception, alteration and retransmission of an audio video program and other data according to an exemplary embodiment of the present disclosure is shown. In an exemplary embodiment, the method may be performed by a micro ATSC transmitter. The method is first operative for receiving 510 a request for to transcode an audio video program. The request may be received from an ATSC broadcaster and may be received via a wireless cellular network or via a primary ATSC broadcast signal. In one example, the request may be generated in response to a loss of reception of a primary ATSC broadcast signal at an ATSC receiver.

The satellite broadcast signal may be decoded 520 to generate an audio video program signal in response to the request. The satellite broadcast signal may be transmitted by a satellite television broadcaster via a satellite having a broad national broadcast footprint. Alternatively, the satellite broadcaster may transmit some audio video programs, such as local television channels, to separate regions using directional transponders having a footprint covering the local region. The satellite broadcast signal may transmitted by a satellite television broadcaster and the audio video program is provided to the satellite television broadcaster by an ATSC broadcaster.

The method is next operative to encode 530 the audio video program signal to generate an ATSC broadcast signal. In one exemplary embodiment, the audio video program may be altered by substituting a portion of the audio video program with an alternate audio video program portion to generate an altered audio video program and wherein the audio video program is encoded to generate the ATSC broadcast signal. The alternate audio video program portion may be received via the request or may be stored in a memory within the exemplary micro ATSC transmitter. The ATSC broadcast signal may then be transmitted 540 via an ATSC transmission tower.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the disclosure in any way. To the contrary, various changes may be made in the function and arrangement of the various features described herein without departing from the scope of the claims and their legal equivalents.

The invention claimed is:

1. A method, performed by a micro ATSC transmitter, comprising:
receiving a request to transcode an audio video;
decoding, by a satellite signal decoder, a satellite broadcast signal to generate an audio video program signal in response to the request;
encoding, by an ATSC encoder, the audio video program signal to generate an ATSC broadcast signal;
transmitting, by the micro ATSC transmitter, the ATSC broadcast signal via an ATSC transmission tower.

2. The method of claim 1 wherein the satellite broadcast signal is transmitted by a satellite television broadcaster.

3. The method of claim 1 further including substituting a portion of the audio video program with an alternate audio video program portion to generate an altered audio video program and wherein the audio video program is encoded to generate the ATSC broadcast signal.

4. The method of claim 1 wherein the request is generated in response to a loss of reception of a primary ATSC broadcast signal at an ATSC receiver.

5. The method of claim 1 wherein the request is generated by an ATSC broadcaster.

6. The method of claim 1 wherein the request is received via a cellular wireless network.

7. The method of claim 1 wherein the satellite broadcast signal is transmitted by a satellite television broadcaster and the audio video program is provided to the satellite television broadcaster by an ATSC broadcaster.

8. A micro ATSC transmitter comprising:
a satellite signal decoder configured to decode a satellite broadcast signal to generate a received audio video program;
a data decoder configured for decoding a data signal from an ATSC broadcaster;
a video processor configured to generate an altered audio video program in response to the received audio video program and the data signal;
an ATSC encoder configured to encode the altered audio video program to generate an ATSC broadcast signal; and
the micro ATSC transmitter configured to transmit the ATSC broadcast signal.

9. The micro ATSC transmitter of claim 8 wherein the data signal includes a substitute audio video program and wherein a portion of the received audio video program is replaced by the substitute audio video program to generate the altered audio video program.

10. The micro ATSC transmitter of claim 8 wherein the data decoder is configured to receive the data signal from a cellular network receiver.

11. The micro ATSC transmitter of claim 8 wherein the data signal is generated by an ATSC broadcaster.

12. The micro ATSC transmitter of claim 8 wherein the data signal includes auxiliary ATSC data including at least one of a transmitter identification, a guide information, and a subchannel program.

13. The micro ATSC transmitter of claim 8 wherein the satellite broadcast signal is transmitted by a satellite television broadcaster in response to an ATSC broadcast audio video program generated by an ATSC broadcaster.

14. The micro ATSC transmitter of claim 8 further including an ATSC receiver configured to detect a signal level of a primary ATSC broadcast signal and wherein the data signal is generated in response to the signal level being below a threshold signal level.

15. The micro ATSC transmitter of claim 8 wherein the data signal is generated in response to a loss of signal notification generated by an ATSC receiver proximate to the apparatus.

16. The micro ATSC transmitter of claim 8 further including an ATSC receiver configured to receive a primary ATSC broadcast signal and wherein the data signal is generated in response to the primary ATSC broadcast signal.

17. A micro ATSC transmitter comprising:
a cellular transceiver configured receive a request to transmit an ATSC broadcast signal wherein the request includes a satellite signal identifier and an ATSC auxiliary data;
a global positioning system configured to estimate a location;
a satellite receiver configured to receive a satellite broadcast signal and to decode the satellite broadcast signal to generate a received audio video program;
a video processor configured to generate an altered audio video program in response to the request, the location, and the received audio video program; and
an ATSC transmitter for encoding the altered audio video program to generate an ATSC broadcast signal and to transmit the ATSC broadcast signal to an ATSC receiver.

18. The micro ATSC transmitter of claim 17 wherein the request is generated in response to a signal level of a primary ATSC broadcast signal detected by the ATSC receiver.

* * * * *